Jan. 31, 1950        J. JONES        2,495,813
TRUCK FOR TURNTABLES
Filed July 3, 1945        2 Sheets-Sheet 1
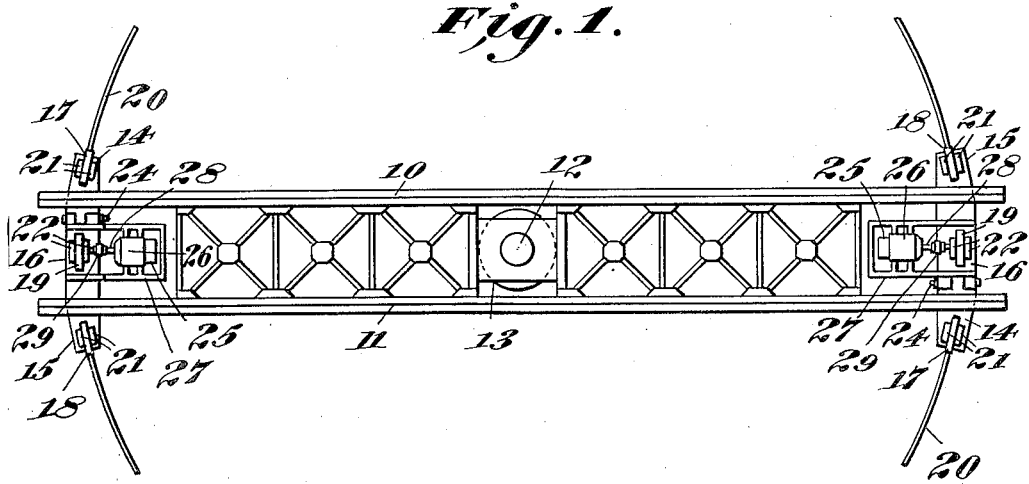
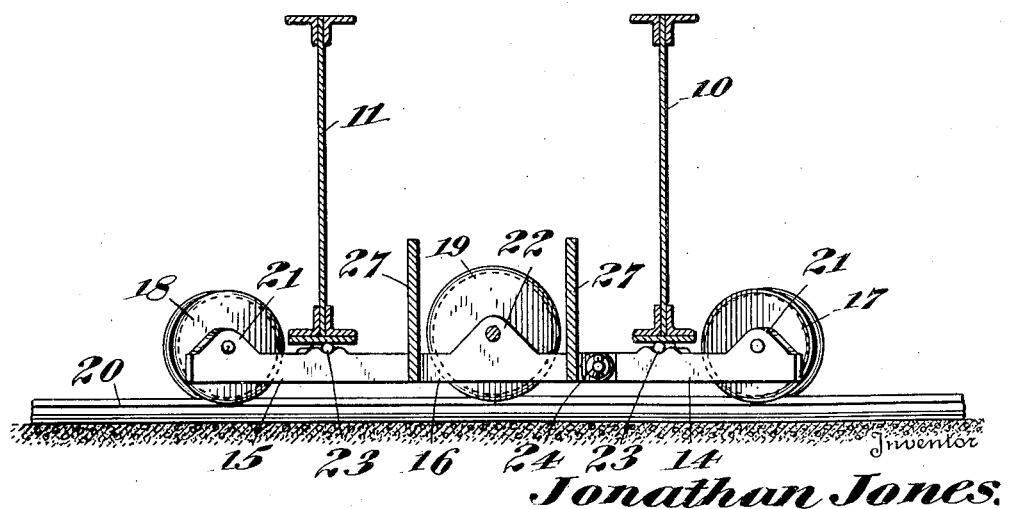
Inventor
Jonathan Jones.
By R. S. C. Dougherty.
Attorney Jan. 31, 1950   J. JONES   2,495,813
TRUCK FOR TURNTABLES
Filed July 3, 1945   2 Sheets-Sheet 2
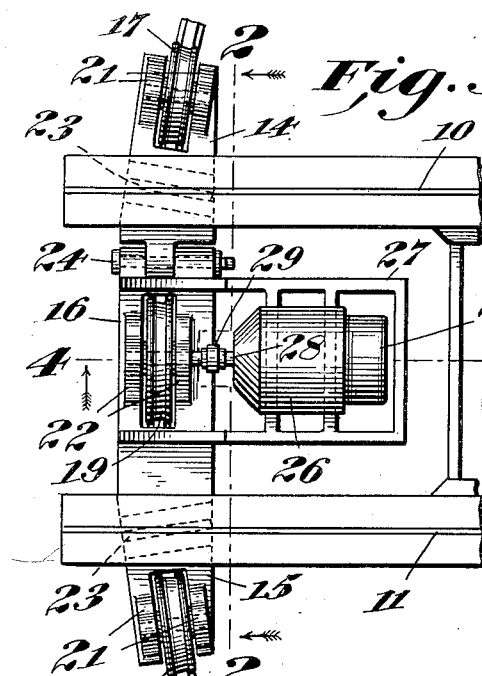
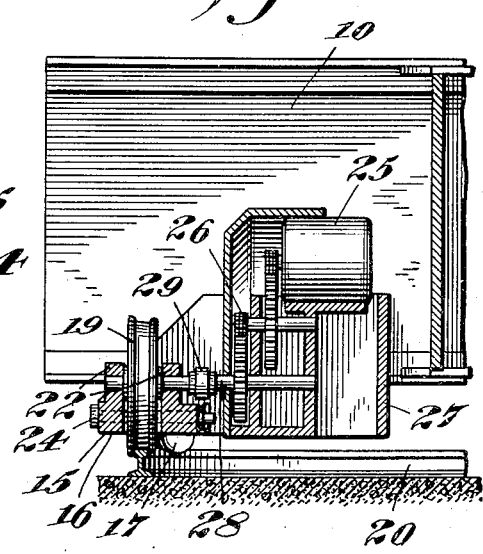
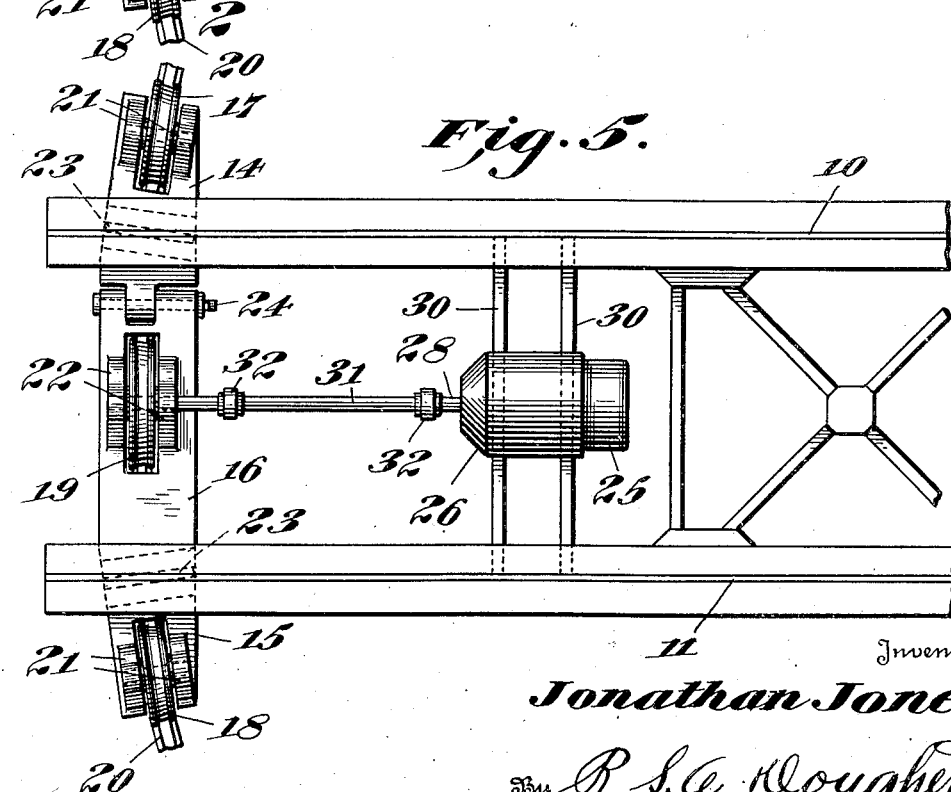
Inventor
Jonathan Jones.
By R. S. C. Dougherty.
Attorney Patented Jan. 31, 1950

2,495,813

UNITED STATES PATENT OFFICE 2,495,813

TRUCK FOR TURNTABLES

Jonathan Jones, Bethlehem, Pa., assignor to Bethlehem Steel Company, a corporation of Pennsylvania Application July 3, 1945, Serial No. 602,964

4 Claims. (Cl. 104—35)

This invention relates to improvements in end trucks for steel turntables particularly such tables as are used in turning railway locomotives or the like about a vertical axis.

It is an object of this invention to provide at each end of the turntable one three-wheeled truck comprised of two portions connected so that the parts are hinged by means of a pin connected joint thus permitting relative movement between the two portions and thereby allowing each wheel to carry its proportional load even when on an irregular track surface.

The present invention provides at each end of the turntable a novel design of hinged three-wheeled truck of which the outer wheels are positioned one outside of and adjacent each main girder and the third wheel is positioned intermediate the two main girders thus carrying the end load from the two girders on a single three-wheeled truck. By proper selection of the distances between the respective wheels and the respective main girders the total end load of the two main girders may be divided among the three wheels in any one of a wide choice of ratios. If desired the load may be equally distributed to the three wheels, but since the interior wheel is the driven wheel and it being well known that for ease of operation of rolling devices it is desirable to create the maximum practicable tractive reaction under that wheel, or those wheels, to which driving force is applied, it will tend to produce better results in operation if more than one-third of the end load of the two girders is carried by this wheel, for instance, one typical and illustrative division could be one-fourth to each outer wheel and one-half to the inner wheel.

It is a further object of this invention to provide a hinged three-wheeled truck readily adaptable to track irregularities and having a gear motor mounted on, and its weight carried entirely by, the truck so that the axle of the driven wheel and the driving shaft of the power transmitting means are in direct alignment.

In the accompanying drawings:

Figure 1 is a plan view of a turntable from which such elements as will not contribute to an understanding of this invention have been omitted.

Figure 2 is a vertical section through the main girders taken on the line 2—2 of Figure 3.

Figure 3 is an enlarged view of one end of the turntable shown in Figure 1.

Figure 4 is a vertical section taken midway between the main girders as indicated by line 4—4 of Figure 3.

Figure 5 is an alternative arrangement of the driving mechanism as shown in Figure 3.

Referring to the drawings more in detail 10 and 11 are the two main girders or beams of the turntable, 12 indicates the pivot and 13 is the structural means for transferring the load carried by the girders 10 and 11 to the pivot 12, 14 and 15 are portions comprising the truck 16 in which the exterior wheel 17 is mounted in portion 14 while the exterior wheel 18 and the interior wheel 19 are mounted in portion 15. The wheels travel upon the circular rail 20 which may form a complete circle or may consist of a part of a circle only as the circumstances may warrant. 21 and 22 indicate bearings or journals whereby load from the truck is transmitted through the axles of the wheels to the respective wheels.

The load from the main girders 10 and 11 is transmitted to the truck 16 through a bearing 23 which has a line or surface contact only with the truck thus forming a fulcrum permitting either of the portions of the truck to rotate in a vertical plane if and when one of the wheels 17, 18 or 19 passes over a relatively high or a relatively low portion of the circular rail 20.

The portions 14 and 15 of the truck 16 are connected by the hinge pin 24, so that the portions cannot be separated except by the intentional withdrawal of the hinge pin 24, this pin provides for the transferral of vertical shear from portion 14 to 15 or vice versa but no substantial bending moment can be transmitted across the hinge. The effect of introducing the hinge and hinge pin 24 is to impart vertical rotational flexibility to the truck such as could not exist through the use of supports 23 without hinge pin 24. By reason of this rotational flexibility it is rendered possible for each of the three wheels to follow irregularities in the surface of the circular rail 20 without substantial or detrimental change in the distribution of load to the wheels. Each wheel thus assumes its proportional share of the load on an uneven rail practically the same as when on a true or level rail. Irregularities in the rail frequently occur due to uneven settlement of the rail foundation and it is quite desirable to provide for such a condition.

The motive power is provided by a motor 25 which includes a speed reducer unit 26 carried upon structural supports 27 which in turn are carried directly by truck 16. The output shaft 28 of the gear motor is connected to the axle of the interior driven truck wheel 19 by means of the coupling 29 which may be of the flexible type if desirable.

In the alternative arrangement for mounting the motor as shown in Figure 5 the motor 25 with speed reducer is mounted upon the structural supports 30 which transfer its weight to the main girders 10 and 11. 31 is a connecting shaft between the output shafts 28 of the motor and the axle of the driven wheel 19, the connecting shaft being provided with the flexible couplings 32.

It will be obvious to those skilled in the art that my invention as shown is susceptible of various changes and modifications without departing from the spirit thereof and I desire, therefore, that only such limitations shall be placed thereupon as are imposed by the prior art or as are specifically set forth in the appended claims.

Having thus described my invention, what I claim as new and desire to secure by Letters Patent is:

1. In a turntable comprising two cross-connected girders supported on a pivot at the center and on wheels at or near each end, trucks rockably supporting said girders and supported on said wheels, said trucks each comprising two portions with two wheels mounted in one portion and a single wheel in the other portion and a pin joint, or other means to form an effective hinge between the two portions, and with said wheels arranged one outside and adjacent each of said girders and a third wheel intermediate said girders so that any wheel, because of the rocker support of the girder on the trucks, may rise or fall relatively to the other wheels, due to rail surface irregularities, without materially altering the proportion of the total load which is carried by each wheel and without causing flexure in either of the girder ends.

2. In a turntable comprising two cross-connected girders supported on a pivot at the center and on wheels at or near each end, trucks supporting said girders and supported on said wheels, said trucks each comprising two portions with two wheels mounted in one portion and a single wheel in the other portion and a pin joint or other means to form an effective hinge between the two portions, each of said truck portions having a rocker connection to its respective girder so that a relative movement of the truck portions may occur without causing flexure in the end portions of the girders, the said wheels being arranged one outside and adjacent to each of said girders and a third wheel intermediate said girders so that when rail irregularities occur, any wheel may change its vertical position relative to the other wheels without materially altering the proportion of the total load which is carried by each wheel.

3. In a turntable comprising two cross-connected girders supported on a pivot at the center and on wheels at or near each end, trucks rockably supporting said girders and supported on said wheels, said trucks each comprising two portions with a pin joint, or other means to form an effective hinge between the two portions, said hinge joint being located at a point remote from the axis of the center wheel and intermediate the girder bearings and with said wheels arranged one outside and adjacent each of said girders and a third wheel intermediate said girders, so that any wheel, because of a rocker or roller means of girder support on the trucks, may rise or fall relatively to the other wheels, due to rail surface irregularities without materially altering the proportion of the total load which is carried by each wheel, and a motor so supported by the frame of the truck in which said wheel intermediate said girders is mounted that the shaft of the power transmitting means and the axle of said intermediate wheel are in direct horizontal alignment, whereby said wheel may be rotated and the table turned about its center.

4. In a turntable comprising two cross-connected girders supported on a pivot at the center and on wheels at or near each end, trucks supporting said girders and supported on said wheels, said trucks each having three wheels comprising two portions hingedly joined together by a pin joint located remote from the axis of the wheels but intermediate the girders, two wheels mounted in one portion and the remaining wheel in the other portion.

JONATHAN JONES.

REFERENCES CITED

The following references are of record in the file of this patent:

UNITED STATES PATENTS

| Number | Name | Date |
| --- | --- | --- |
| 1,265,374 | Pilcher | May 7, 1918 |
| 1,386,060 | Hilpert | Aug. 2, 1921 |
| 1,811,931 | Hilpert | June 30, 1931 |

FOREIGN PATENTS

| Number | Country | Date |
| --- | --- | --- |
| 368,581 | Germany | Nov. 16, 1921 |
| 573,804 | Germany | Apr. 6, 1933 |